Figure 1:
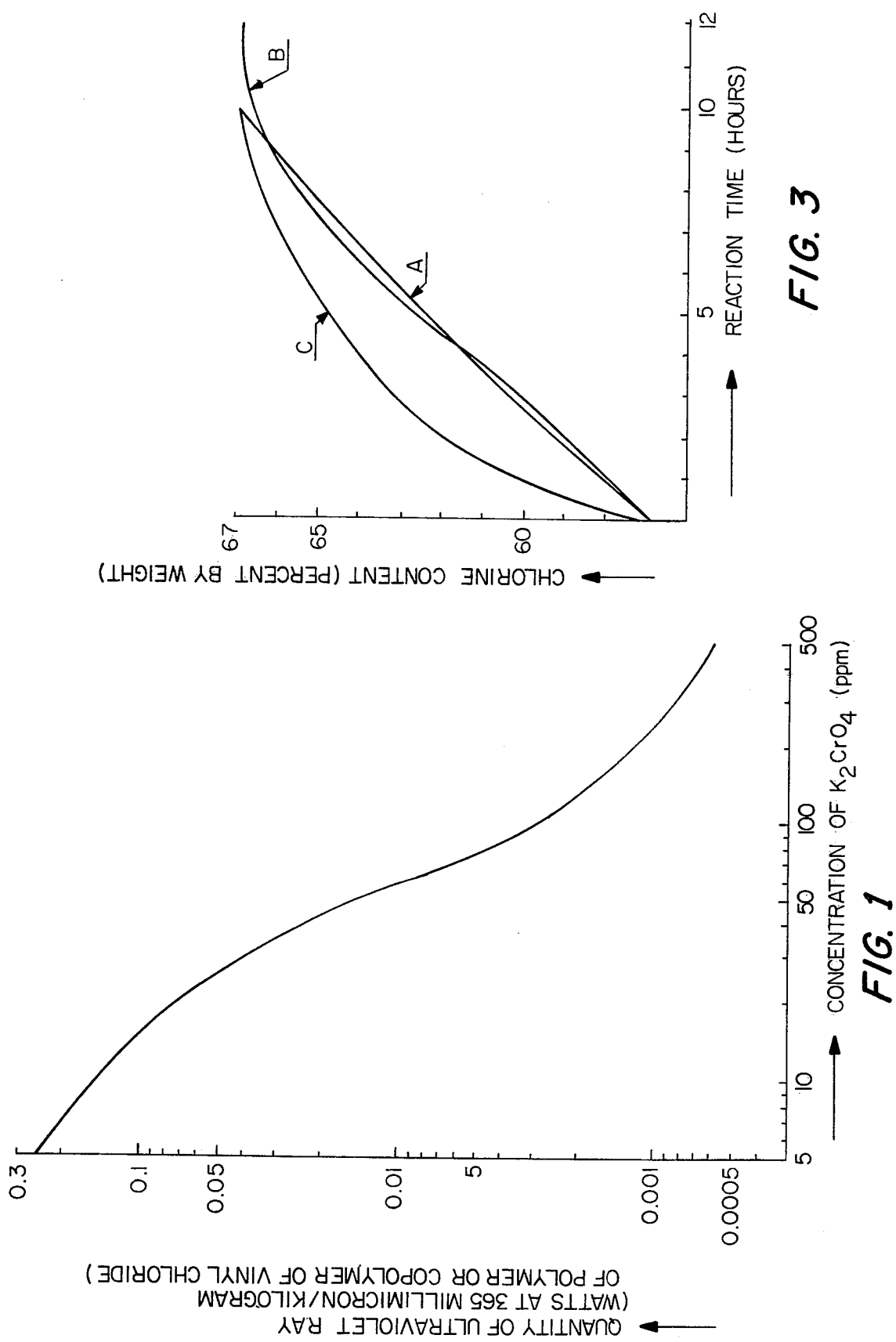

United States Patent [19]

Adachi et al.

[11] 4,049,517

[45] Sept. 20, 1977

[54] PROCESS FOR PREPARING CHLORINATED POLYMER OR COPOLYMER OF VINYL CHLORIDE

[75] Inventors: Terufumi Adachi; Tatsuro Oda, both of Shinnan, Japan

[73] Assignee: Tokuyama Sekisui Kogyo Kabushiki Kaisha, Osaka, Japan

[21] Appl. No.: 573,830

[22] Filed: May 2, 1975

[30] Foreign Application Priority Data

May 18, 1974 Japan .................................. 49-55794

[51] Int. Cl.$^2$ ............................................. C08F 8/18
[52] U.S. Cl. ...................... 204/159.18; 260/29.6 CM; 260/96 HA; 526/17; 526/45
[58] Field of Search ................... 204/159.18; 260/884, 260/29.6 CM, 96 HA; 526/17, 43, 45

[56] References Cited

U.S. PATENT DOCUMENTS

| | | | |
|---|---|---|---|
| 2,426,080 | 8/1947 | Chapman et al. | 526/17 X |
| 3,362,896 | 1/1968 | Bier et al. | 204/159.18 |
| 3,487,129 | 12/1969 | Platzer | 260/878 |
| 3,585,117 | 6/1971 | Gresser et al. | 204/159.18 |
| 3,621,078 | 11/1971 | Kitamura et al. | 260/884 |
| 3,700,632 | 10/1972 | Beale et al. | 260/87.5 C |
| 3,925,337 | 12/1975 | Heiberger | 526/17 |

*Primary Examiner* — Murray Tillman
*Assistant Examiner* — Thurman K. Page
*Attorney, Agent, or Firm* — Armstrong, Nikaido & Marmelstein

[57] ABSTRACT

A process for preparing a chlorinated polymer or copolymer of vinyl chloride which comprises varying the amount of ultraviolet rays irradiated to a unit amount of the polymer or copolymer to control the reaction rate within the range from 0.75–0.25 mole/hour/kilogram of the polymer or copolymer until the rate of substitution of chlorine attains at least 1.6 moles/kilogram of the polymer or copolymer, the polymer or copolymer being chlorinated in an aqueous suspension under irradiation of ultraviolet rays. The polymers so produced have excellent thermal stability and excellent processability.

5 Claims, 6 Drawing Figures

PROCESS FOR PREPARING CHLORINATED POLYMER OR COPOLYMER OF VINYL CHLORIDE

This invention relates to an improved process for chlorinating a polymer or copolymer of vinyl chloride. In particular, this invention relates to a process for preparing a chlorinated or copolymer of vinyl chloride having excellent thermal stability and excellent processability, characterized by varying the quantity of ultraviolet rays irradiated to a unit amount of the polymer or the copolymer of vinyl chloride (hereinafter referred to as QUVUR) in accordance with the progress of the chlorination reaction, while the polymer or the copolymer is chlorinated under irradiation of ultraviolet rays.

Chlorinated polymer or copolymer of vinyl chloride (hereinafter referred to as Cl-VCR) has a softening point considerably higher than that of a polymer or copolymer of vinyl chloride (hereinafter referred to as VCR), and is used in a wide range of applications. Owing to the high softening point, however, Cl-VCR, when processed, should be exposed to a temperature higher than that to which VCR is exposed. Thus, Cl-VCR obtained hitherto has had a tendency to undergo decomposition and coloration when exposed to high temperatures. Therefore, there has been a need to invent a process which provides Cl-VCR having excellent thermal stability and excellent processability by simple and easy operations. The present invention has been made in order to comply with such a need.

Among processes hitherto carried out for preparing Cl-VCR, a process in which VCR is chlorinated in a solvent has an advantage in that the chlorination reaction can be carried out in a homogeneous phase, however, it has a disadvantage in that it is difficult to completely remove the solvent from the product. Another process, in which VCR is reacted in the form of dry powders directly with gaseous chlorine, is not accompanied by said disadvantage, but is unacceptable for industrially carrying out the process, owing to difficulties for homogeneously carrying out the chlorination reaction and removing the reaction heat generated therein. Thus, in general industrial practise for preparing Cl-VCR, there is employed a process in which gaseous chlorine is reacted under irradiation of ultraviolet rays with VCR suspended in water.

In general, a reaction in which VCR is chlorinated under irradiation of ultraviolet rays is satisfactorily carried out at its initial stage even by irradiation from a fluorescent lamp such as commonly used for lighting a room. This is generally known. When a small quantity of ultraviolet rays is irradiated to unit amount of VCR, it may be sufficient at the initial stage of the reaction, however, it may bring about disadvantages in that the reaction rate decreases considerably at its later stage of the reaction and the reaction proceeds too slowly to reach completion. If excess amount of ultraviolet rays are irradiated to the unit amount of VCR in order to increase the reaction rate, the chlorination reaction occurs unevenly in VCR and Cl-VCR thus formed has a disadvantage in that it tends to decompose and, consequently, this method can not provide a product that is excellent in thermal stability and processability. In order to control the reaction rate, in addition to the above, there are various methods, such as a method of controlling the concentration of dissolved chlorine, a method of adding oxygen and catalyst thereto and a method of controlling reaction temperature, however, any of these methods do not provide satisfactory results.

For overcoming the disadvantages, a known method has been employed in which chlorination is carried out under such low photochemical activation that excess chlorine can be present at a temperature less than 65° C in the presence of hydrochloro methylene (swelling agent), which method is disclosed in the Japanese Patent Publication No. 36-888. This known method contemplates always carrying out the chlorination reaction in the presence of excess chlorine by controlling the flow velocity of chlorine and by controlling the quantity of ultraviolet rays to a relatively low level in order to avoid a decline in the relative chlorine concentration caused by excess irradiation of ultraviolet rays and the occurence of objectionable side reactions.

The inventors at first contemplated that the decline in the relative chlorine concentration could be prevented, if the amount of dissolved chlorine could be increased by adding pressure instead of decreasing the quantity of ultraviolet rays irradiated to a unit amount of VCR. However, it was found that, even if the amount of the dissolved chlorine is increased to several times as much as that under atmospheric pressure, the reaction rate, under pressure, is almost the same as that under atmospheric pressure wherein the same QUVUR is used. From this result, it was considered that chlorine was not insufficient in the reaction under atmospheric pressure. The concentration of dissolved chlorine was further measured as to reaction liquids being subjected to a photoactivation reaction in both cases, and it was shown that the chlorine was present in almost the same ratio as in the saturated aqueous chlorine solution at the reaction temperature. From such measurements, it was considered that said reactions were carried out in a state wherein the chlorine was saturated.

The inventors then contemplated a process wherein the reaction rate was controlled by controlling QUVUR instead of controlling the concentration of chlorine. Thus the inventors conducted further studies, and, as a result, found that it was necessary to maintain the reaction rate in the range from 0.75 and 0.25 mole/hour/kg of VCR, at least before a rate of substitution of chlorine was reached of about 1.6 moles/kg of VCR, in order to obtain Cl-VCR having excellent thermal stability and processability. If the reaction rate is increased to more than 0.75 mole/hour/kg of VCR, the formed resin deteriorates in processability, and, conversely, if the reaction rate is decreased to less than 0.25 mole/hour/kg of VCR, considerable time is required to obtain a product having sufficient chlorine content, and decomposition is caused by the rays and heat. In general, the reaction is high in the early stages and low in the later stages, and, therefore, in order to hold the reaction rate within the above range, it is necessary to control QUVUR so that QUVUR may be decreased in the early stages, increased in the later stages, according to the time elapsed. The present invention is based on such findings.

According to the present invention, a process for preparing Cl-VCR is provided which comprises varying QUVUR in accordance with the development of the chlorination reaction to control the reaction rate within the range of from 0.75 – 0.25 mole/hour/kilogram of VCR until the rate of substitution of chlorine attains at least 1.6 moles/kilogram of VCR, while the VCR is chlorinated in an aqueous suspension under irradiation of ultraviolet rays.

The rate of substitution of chlorine, reaction rate and QUVUR are defined respectively as follows:

Rate of substitution of chlorine
$$= \frac{\text{Amount of chlorine added to VCR (moles)}}{\text{Charged amount of VCR (kilograms)}}$$
Reaction rate
$$= \frac{\text{Amount of chlorine added to VCR per one hour (moles/hour)}}{\text{Charged amount of VCR (kilograms)}}$$
= Rate of substitution of chlorine per one hour
QUVUR = Energy of light given to a unit amount of VCR The reaction of the invention is preferably carried out by suspending VCR in an aqueous medium in a reaction vessel provided with an agitator and a nozzle, and blowing chlorine from the nozzle into the aqueous medium under irradiation of ultraviolet rays, wherein the aqueous medium dissolves the chlorine and is saturated with the chlorine in a short time.

VCR used in the invention includes homopolymers of vinyl chloride, and copolymers containing a major portion of vinyl chloride and minor portion of another monomer of monomers which are capable of copolymerizing with the vinyl chloride. Said monomers include vinylidene chloride, vinyl acetate, styrene, acrylonitrile, methyl methacrylate, ethylene, propylene and the like. Further, VCR includes graft-copolymers which may be prepared by grafting vinyl chloride onto a copolymer of ethylene and vinyl acetate.

VCR may be used which is prepared by various processes, such as suspension polymerization, emulsion polymerization, block polymerization, and solution polymerization, and the like. Cl-VCR, however, is normally prepared by chlorinating VCR which has been prepared by an aqueous suspension polymerization process because of quality and cost of Cl-VCR.

In aqueous suspension polymerization processes are generally used oil-soluble catalysts such as isopropyl peroxydicarbonate, di-2-ethylhexyl peroxydicarbonate, di-2-butyl peroxydicarbonate, and t-butyl peroxypivalate. The catalysts normally have low decomposition temperatures, and are accompanied by dangers, particularly, in handling them in their pure form. Thus, solvents such as aromatic hydrocarbons, alone or mixtures thereof, such as benzene, toluene and mineral spirits are used as diluents for the catalysts.

It was found that solvents should not be used for preparing VCR where the VCR was to be used for the preparation of Cl-VCR. This is because of the following facts which were found. The solvents are commonly absorbed or occluded in the polymer or copolymer when they are mixed, and are chlorinated to form chlorinated solvents in the following chlorination step. When the chlorinated solvents are heated in a further step for processing, they are molten and evaporate to generate an offensive smell. Meanwhile, when liquid paraffin is used instead of the solvent used heretofore, the liquid paraffin acts as a good solvent for the catalysts and does not give rise to any offensive smell. Though some portion of the liquid paraffin present in VCR is chlorinated to form chlorinated paraffin in the course of chlorination reaction, the chlorinated paraffin is less toxic and does not give rise to any offensive smell, but acts as a good plasticizer for Cl-VCR, as is well known in the art. It is preferable to use liquid paraffin having a viscosity between 10 and 39 centistokes at 30° C.

The suspensions used for the chlorination reaction in the invention comprise preferably 200 to 500 parts by weight of an aqueous medium against 100 parts by weight of the polymer or copolymer of vinyl chloride as stated above. The aqueous medium may contain water or may be a solution containing, for example, hydrochloric acid in order to increase solubility of the chlorine in water. Further, the aqueous medium may contain a surface active agent or an anti-foaming agent.

In order to control QUVUR in the manner as stated above, it is preferable to gradually increase the quantity of ultraviolet rays irradiated to a unit amount of VCR to such a degree that the reaction rate may be in the range from 0.75 and 0.25 mole/hour/kilogram of the polymer or copolymer without varying the area irradiated by the ultraviolet rays. It was proven by experiments that the reaction rate in the early stages of the reaction was almost equal to the rate in the later stages of the reaction, when the quantity of ultraviolet rays in the early stages was controlled to be about one hundredth of that of the ultraviolet rays in the later stages. Though it is preferable to continuously control QUVUR, the quantity may be controlled in a graded fashion. When a reaction vessel is provided with plural means for generating ultraviolet rays, the quantity of ultraviolet rays may be somewhat controlled by increasing or decreasing the number of the lighting means. However, it is preferable in such cases to control the total quantity of ultraviolet rays as minutely as possible by simultaneous control of the quantity of ultraviolet rays irradiated from each of the lighting means.

A preferable method for controlling the quantity of ultraviolet rays irradiated to the polymer or copolymer is to use water containing an ultraviolet-ray-absorbing agent for cooling the means for generating ultraviolet rays. The ultraviolet-ray-absorbing agent may be potassium chromate, copper nitrate, potassium permanganate, cupric chloride and the like. It is necessary to select and use ultraviolet-ray-absorbing agents which have a great ability to absorb the ultraviolet rays in comparison with the weight of the agents added thereto, and to use those which do not decompose when subjected to irradiation of the ultraviolet rays. The inventors tried many experiments and have found that potassium chromate is the most preferred ultraviolet-ray-absorbing agent. If one of the ultraviolet-ray-absorbing agents is used, it is possible to gradually increase QUVUR by decreasing the concentration of the ultraviolet-ray-absorbing agent as the chlorination reaction advances. Further, it is also possible to control QUVUR by varying the electric current for generating ultraviolet rays as the time elapses. Various ways may be adopted for controlling the quantity of ultraviolet rays irradiated to a unit amount of VCR.

The chlorination reaction in the invention should be carried out by controlling the reaction rate within the range as stated above, at least before the rate of substitution of chlorine reaches 1.6 moles/kilogram of VCR. The chlorination reaction after that may be carried out further by controlling the reaction velocity in the same manner as above, or may be carried out without controlling the reaction velocity, because the reaction velocity is considerably decreased when the rate of substitution of chlorine has reached above value.

The invention will be further illustrated by way of examples and it will be apparent that the invention provides excellent results when comparing the results of the examples with those of the comparative examples.

Values stated in the examples and comparative examples are measured by the following methods.

Chlorine content: This is measured by heating to decompose the Cl-VCR in potassium hydroxide to form the chlorine ion and titrating the chlorine ion with a silver nitrate solution, using potassium chromate as the indicator. (Japanese Industrial Standard K-5634 Mohr's method)

Thermal stability: This is measured by heating Cl-VCR to 200° C to form hydrogen chloride and measuring the time required to turn to wet Congo Red test paper red by the presence of hydrogen chloride thus formed. The longer the time, the superior the thermal stability.

Needle penetration temperature: Resin sheets are first prepared by mixing 100 parts by weight of Cl-VCR with 4.0 parts of a lead stabilizer, 2.0 parts of a lubricant and 5.0 parts of a copolymer of ethylene and vinyl acetate, and kneading the resultant mixture by rolls at 190° C for 5 minutes. The sheets are then pressed under a pressure of 150 kg/cm² at 190° C in a press to form a resin plate having a thickness of 2 mm. The temperature is measured at which a needle penetrates into the plate according to the method described in the Japanese Industrial Standard K-6742. The higher the temperature, the better the stability.

Impact strength: This is measured by using the above resin plate according to the method described in the Deutsche Industrie Norm 53453. The larger the value, the higher the impact strength.

Plastograph gelling time: This is determined by measuring the gelling time of the mixture, as described under the above "Needle penetration temperature," by employing a Brabender Plastograph PL-3S, wherein the oil temperature is 205° C, the kneading zone temperature 180° C and a mixer is rotated at 30 rpm. The smaller the value, the better the processability.

QUVUR: This is measured by means of a tester for measuring the intensity of ultraviolet rays (UV-365 made by Ushio Electric Co.) at a wave length of 3650 angstroms.

The reaction rate, chlorine content in the resins and concentration of potassium chromate were measured every hour from the beginning of the chlorination reaction in each of the examples and comparative examples, and they are listed in the annexed tables.

EXAMPLE 1 a. Into a 150 liter autoclave made of stainless steel were placed 90 kg of pure water, 13.5 g of polyvinyl alcohol, 22.5 g of methylcellulose and 18 g of di-2-ethylhexyl peroxydicarbonate which was diluted with liquid paraffin (content of liquid paraffin was 30% by weight). After the ingredients were thoroughly mixed, the autoclave was closed and the air in the autoclave was removed by suction. Then, 45 kg of vinyl chloride was charged under pressure and polymerized for 7 hours at 58° C while stirring. The polymerized reaction mixture in the autoclave was removed and centrifuged to separate the solids, which were dried to give a porous powder of polyvinyl chloride having an average particle size of 200 microns and a porosity of 30% by volume.

b. In a glass-lined, jacketed reaction vessel of 300 liters, which was provided with a mechanical stirrer rotatable at 300 rpm and an internal ultraviolet ray irradiater, were charged 45 kg of the powder obtained in (a) above and 180 kg of water. Gaseous nitrogen was blown into the reaction system under sufficient stirring to remove the oxygen present, while the internal temperature was maintained at 50° C by passing warm water through the jacket and a resulting suspension was formed.

Gaseous chlorine was introduced into the suspension to saturate the reaction system. After the saturation was attained, the suspension was irradiated with ultraviolet rays to initiate the reaction. The flow rate of chlorine gas was controlled so that the reaction system could be continuously saturated with chlorine and one-tenth of introduced chlorine could be released. Ultraviolet rays were irradiated from a 1 KW high pressure mercury lamp fitted with a cooling jacket. The power of ultraviolet rays irradiated to a unit amount of VCR was regulated in such a manner that the reaction rate was constantly maintained at 0.4 mole/hour/kilogram of polyvinyl chloride. Thus, the reaction was initiated under irradiation of ultraviolet rays with a power of 0.0017 W/kg of polyvinyl chloride at a wave length of 3650 angstroms, which power was adjusted by adding 140 ppm of potassium chromate into the cooling water, the QUVUR was continuously increased by gradually decreasing the content of potassium chromate in the cooling water.

Figure 2:
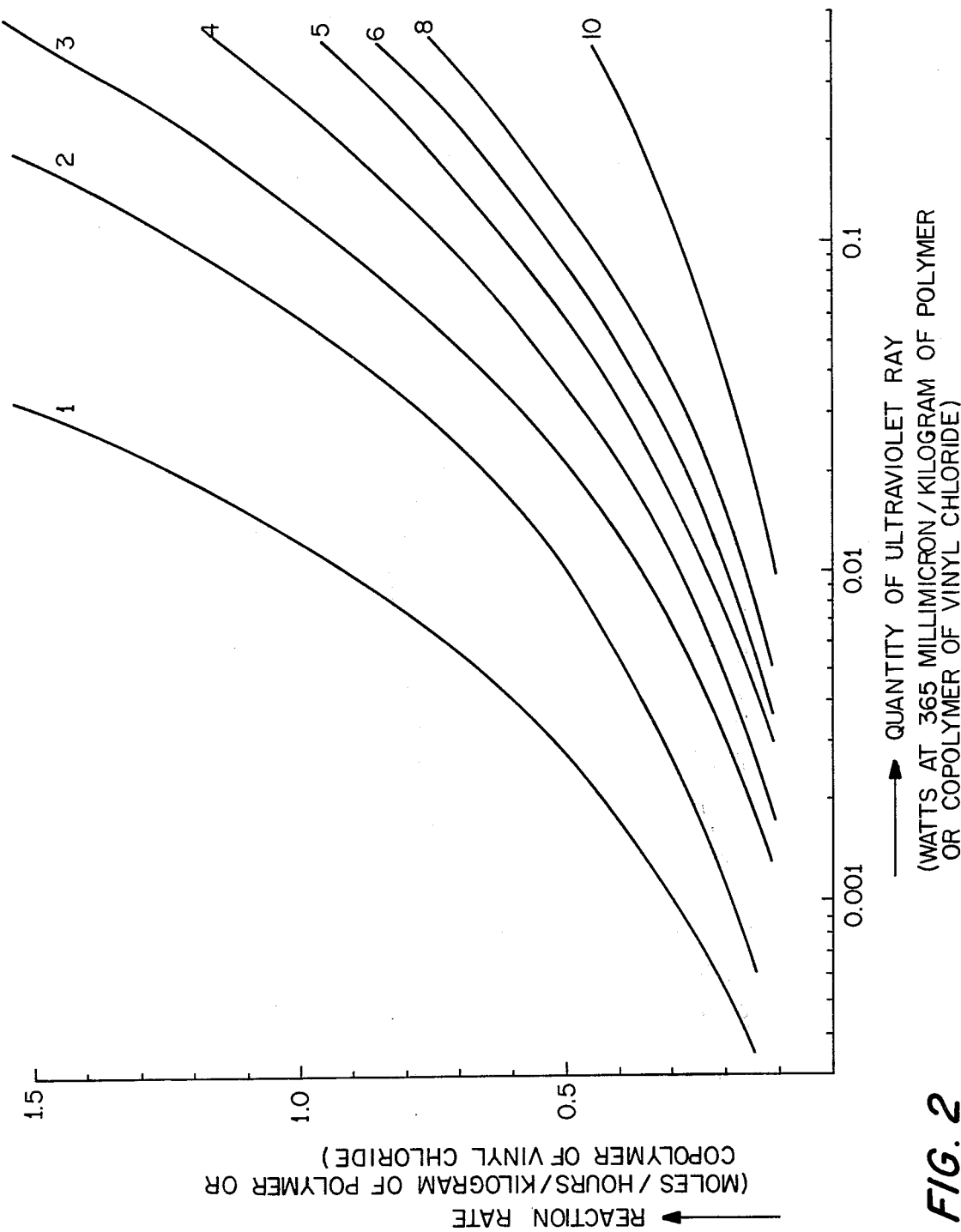

The quantity of potassium chromate which should be added to the cooling water may be read from a graph in such a manner as follows: FIG. 1 shows the relation between the concentration (ppm) of potassium chromate in the cooling water and QUVUR (W/kg-VCR). FIG. 2 shows the relation between QUVUR (W/kg-VCR) and the reaction rate (mole/hour/kg-VCR) at a certain moment during the reaction when the reaction vessel illustrated above was used. In FIG. 2, curve 1 illustrates the average rate of reaction from 0 to 1 hour, curve 2 illustrates the same from 1 to 2 hours, and so forth. When it is desired to keep the reaction rate constant at 0.4 mole/hour/kg of polyvinyl chloride, the quantity of ultraviolet rays at each time corresponding to the reaction rate of 0.4 mole/hour/kg can be read from the curves 1, 2 . . . in FIG. 2, and the quantity can be converted into the corresponding concentration of potassium chromate by using FIG. 1 to obtain the amount of potassium chromate which should be added to the cooling water.

When the reaction was continued for 10 hours in the above described manner, the chlorine content of the reaction product attained 67%. Then the irradiation of ultraviolet rays and the introduction of gaseous chlorine were discontinued and the chlorine in the reaction system was replaced by gaseous nitrogen. The suspension obtained was filtered, mixed with water to dilute the hydrogen chloride formed by the reaction, neutralized with dilute aqueous sodium hydroxide, washed and finally, centrifuged to separate the solids, which were dried to provide a white powder of chlorinated polyvinyl chloride.

The change in the chlorine content of polyvinyl chloride during the reaction is shown by curve A in FIG. 3. It can be seen that curve A is essentially straight, and the reaction rate was held approximately constant. The test results of the chlorinated polyvinyl chloride are shown in Table 1.

COMPARATIVE EXAMPLE 1

This Comparative Example was conducted to study the result of reaction in which QUVUR was not varied.

The reaction was carried out in a manner similar to Example 1 (b) for 10 hours except that the quantity of ultraviolet rays was held constant (0.02W/kg polyvinyl chloride), to obtain a white powdery product. The test results of the product obtained are shown in Table 1. The change in the chlorine content of polyvinyl chloride during the reaction is shown by curve C in FIG. 3.

Table 1

|  | Chlorine Content (%) | Thermal Stability (sec.) | Needle Penetration Temperature (° C) | Impact Strength (kg-cm/cm²) | Gelation Time by Plastograph (sec.) |
|---|---|---|---|---|---|
| Example 1 | 67.0 | 43 | 127 | 2.2 | 118 |
| Comparative Example 1 | 67.0 | 18 | 120 | 1.0 | 145 |

It is clear from Table 1 that the product prepared by the process in which QUVUR was varied by the method of this invention was superior to the product with the identical chlorine content which was prepared without varying QUVUR as to thermal stability, heat resistance, impact strength and processability.

EXAMPLES 2 – 4

Figure 4:
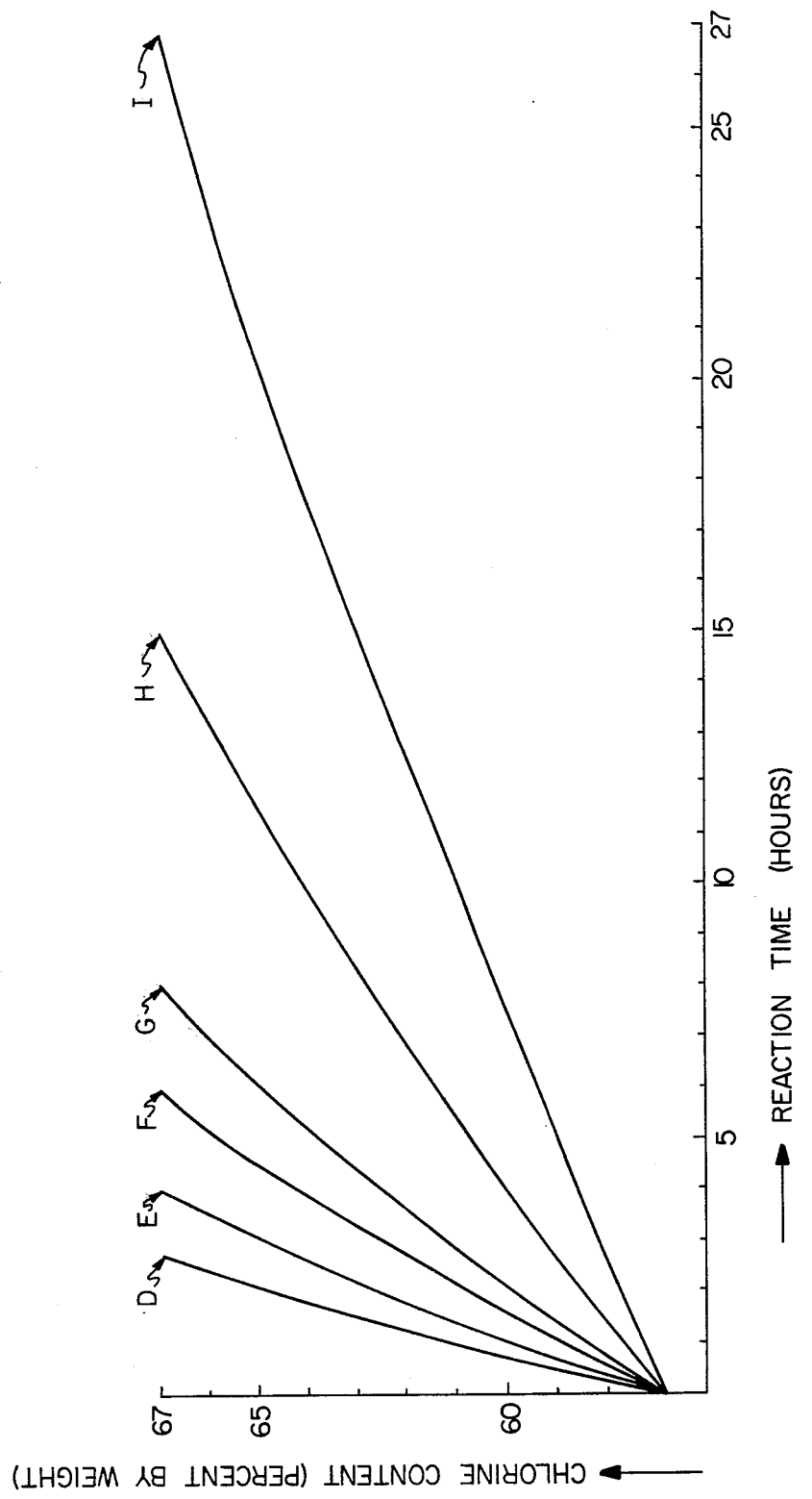

The reactions were carried out in a manner similar to Example 1 (b) except that QUVUR was varied in such a manner that the reaction rate was kept constant at 0.70 (Example 2), 0.50 (Example 3) and 0.28 (Example 4) mole/hour/kilogram of polyvinyl chloride, respectively. The changes of the chlorine content of polyvinyl chloride during the reaction are shown by the curve F (Example 2), G (Example 3) and H (Example 4) in FIG. 4, respectively. It can be seen that curves F, G and H are essentially straight and that the reaction rates were held approximately constant. The test results of the respective products obtained are shown in Table 2.

COMPARATIVE EXAMPLES 2 – 4

The Comparative Examples were conducted to study the results of reactions in which QUVUR was regulated outside the range defined for this invention.

The reactions were carried out in a manner similar to Example 1 (b) except that QUVUR was varied in such a manner that the reaction rate was kept constant at 1.5 (Comparative Example 2), 1.0 (Comparative Example 3) and 0.15 (Comparative Example 4) mole/hour/kilogram of polyvinyl chloride, respectively. The changes in chlorine content of polyvinyl chloride during the reaction are shown by curve D (Comparative Example 2), E (Comparative Example 3) and I (Comparative Example 4) in FIG. 4, respectively. The test results of the respective products obtained are shown in Table 2.

It is clear from Table 2 that the products prepared by the process in which QUVUR was varied within the region defined for the invention were superior to the product of Comparative Example 1 (b) which was prepared without varying QUVUR as to thermal stability, heat resistance, impact strength and processability and also superior to the products prepared by the process in which QUVUR was regulated but outside of the region defined for this invention as shown in Comparative Example 2 –4.

EXAMPLE 5

Figure 5:
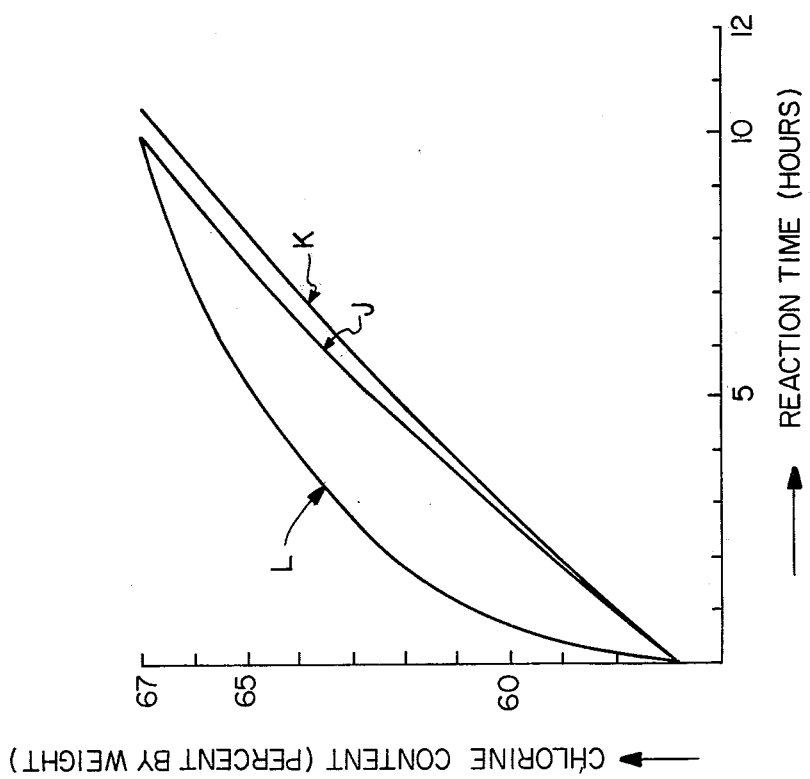

Example 1 (b) was substantially repeated except that QUVUR was varied stepwise every hour to control the reaction rate. The change in chlorine content of polyvinyl chloride is shown by curve J in FIG. 5. The test results of the product obtained are shown in Table 3.

EXAMPLE 6

A reaction was carried out in a manner similar to Example 1 (b), but a pressure of 2.0 kg/cm²G was applied to the reaction system with gaseous chlorine after it was saturated, the pressure was maintained with the gaseous chlorine until the reaction was discontinued, and the quantity of irradiation employed was the same as for Example 5. The change in chlorine content of polyvinyl chloride during the reaction is shown by curve K in FIG. 5. The test results of the product obtained are shown in Table 3.

COMPARATIVE EXAMPLE 5

This Comparative Example was conducted to study the result of the reaction in which QUVUR was not varied and the reaction system was maintained under pressure with pressure with gaseous chlorine.

Comparative Example 1 was repeated except that the reaction system was maintained under a pressure of 2 kg/cm²G. The change in chlorine content of polyvinyl chloride during the reaction is shown by curve L in FIG. 5. The test results of the product obtained are shown in Table 3.

EXAMPLE 7

The reaction was carried out in a manner similar to Example 1 (b), but QUVUR was varied in the same manner as Example 1 (b) in order to keep the reaction rate at 0.4 mole/hour/kilogram of polyvinyl chloride until 4 hours (where the rate of substitution of chlorine was 1.6 moles/kilogram of polyvinyl chloride) after the reaction was started. Thereafter, QUVUR was maintained at a constant value of 0.098 W/kg of polyvinyl chloride using ultraviolet rays at a wave length of 3650 angstroms. The change in chlorine content of polyvinyl chloride during the reaction is shown by curve B in FIG. 3. The test results of the product obtained are shown in Table 3.

Table 2

|  | Reaction Rate (moles/hr/kg) | Chlorine Content (%) | Thermal Stability (sec.) | Needle Penetration Temperature (° C) | Impact Strength (kg-cm/cm²) | Gelation Time by Plastograph (sec.) |
|---|---|---|---|---|---|---|
| Example 2 | 0.70 | 66.9 | 40 | 126 | 2.0 | 122 |
| Example 3 | 0.50 | 67.0 | 45 | 127 | 2.2 | 120 |
| Example 4 | 0.28 | 67.0 | 38 | 125 | 2.0 | 122 |
| Comparative Example 2 | 1.5 | 66.9 | 16 | 120 | 0.8 | 153 |
| Comparative Example 3 | 1.0 | 67.0 | 20 | 122 | 1.0 | 140 |
| Comparative Example 4 | 0.15 | 66.9 | 10 | 118 | 0.9 | 145 |

Table 3

|  | Reaction Time (hours) | Chlorine Content (%) | Thermal Stability (sec.) | Needle Penetration Temperature (° C) | Impact Strength (kg-cm/cm²) | Gelation Time by Plastograph (sec.) |
| --- | --- | --- | --- | --- | --- | --- |
| Example 5 | 10.0 | 67.0 | 42 | 126 | 2.0 | 122 |
| Example 6 | 10.6 | 67.0 | 45 | 126 | 2.2 | 120 |
| Example 7 | 12.0 | 67.0 | 40 | 127 | 1.8 | 122 |
| Comparative Example 5 | 10.0 | 67.0 | 18 | 120 | 0.9 | 145 |

It is clear from Table 3 that the product prepared by the process in which QUVUR was varied stepwise (Example 5), the product prepared by the process in which QUVUR was varied stepwise and the reaction system was maintained under pressure with gaseous chlorine (Example 6), and the product prepared by the process in which QUVUR was varied until the rate of substitution of chlorine attained the value defined for this invention and thereafter was not varied (Example 7), were all superior to the product of Comparative Example 1, which was prepared without varying the QUVUR, as to thermal stability, heat resistance, impact strength and processability. However, the product prepared by the process in which QUVUR was not varied and the reaction system was maintained under pressure with gaseous chlorine (i.e. a large excess of chlorine was present: Comparative Example 5) was not superior to the product of Comparative Example 1.

EXAMPLE 8

Example 1 (b) was substantially repeated except that a copolymer of vinyl chloride and ethylene (chlorine content: 54.5% by weight, average degree of polymerization: 1000) prepared from 96% by weight of vinyl chloride and 4% by weight of ethylene was used in place of polyvinyl chloride to provide a chlorinated copolymer of vinyl chloride and ethylene. The test results of the product obtained are shown in Table 4.

EXAMPLE 9

Example 1 (b) was substantially repeated except that a graft copolymer of vinyl chloride and a copolymer of ethylene and vinyl acetate (chlorine content: 52.2% by weight, average degree of polymerization: 1000) which was prepared by grafting 92% by weight of vinyl chloride onto 8% by weight of a copolymer of ethylene and vinyl acetate (content of vinyl acetate: 26% by weight, MI: 4g/10min) was used in place of polyvinyl chloride, to provide a chlorinated graft copolymer of vinyl chloride and a copolymer of ethylene and vinyl acetate. The test results of the product obtained are shown in Table 4.

COMPARATIVE EXAMPLE 6

Comparative Example 1 was substantially repeated except that the same copolymer of vinyl chloride and ethylene as used in Example 8 was used to provide a chlorinated copolymer of vinyl chloride and ethylene. The test results obtained are shown in Table 4.

COMPARATIVE EXAMPLE 7

Comparative Example 1 was substantially repeated except that the same graft copolymer as used in Example 9 was used to provide a chlorinated graft copolymer of vinyl chloride and a copolymer of ethylene and vinyl acetate. The test results of the product obtained are shown in Table 4.

EXAMPLE 10

Example 1 (b) was substantially repeated except that a copolymer of vinyl chloride and propylene (chlorine content: 55.0% by weight, average degree of polymerization 420) prepared from 97% by weight of vinyl chloride and 3% by weight of propylene was used in place of polyvinyl chloride to provide a chlorinated copolymer of vinyl chloride and propylene. The test results of the product obtained are shown in Table 4.

COMPARATIVE EXAMPLE 8

Comparative Example 2 was repeated except that the same copolymer of vinyl chloride and propylene as used in Example 10 was used to provide a chlorinatd copolymer of vinyl chloride and propylene. The test results of the product obtained are shown in Table 4.

Table 4

|  | Chlorine Content (%) | Thermal Stability (sec.) | Needle Penetration Temperature (° C) | Impact Strength (kg-cm/cm²) | Gelation Time by Plastograph (sec.) |
| --- | --- | --- | --- | --- | --- |
| Example 8 | 65.3 | 35 | 110 | 1.6 | 105 |
| Example 9 | 63.3 | 32 | 100 | 1.7 | 93 |
| Example 10 | 66.2 | 24 | 117 | 0.2 | 68 |
| Comparative Example 6 | 65.3 | 10 | 96 | 0.8 | 115 |
| Comparative Example 7 | 63.3 | 8 | 88 | 0.8 | 105 |
| Comparative Example 8 | 66.2 | 18 | 116 | 0.2 | 75 |

It is clear from Table 4 that the product prepared by the process in which QUVUR was varied by the method of this invention was superior to the product with the identical chlorine content which was prepared without varying QUVUR as to thermal stability, heat resistance, impact strength and processability.

EXAMPLE 11

Example 1 (a) was substantially repeated except that di-2-ethylhexyl peroxydicarbonate diluted with toluene (content of toluene was 30% by weight) was used in place of di-2-ethylhexyl peroxycarbonate diluted with liquid paraffin. The test results of the product obtained are shown in Table 5. This Example was conducted to study the difference of the physical properties, especially the unpleasant odor generated at the time of kneading and shaping, which might be brought out by the difference of the diluent used for the catalyst.

Table 5

| | Chlorine Content (%) | Thermal Stability (sec.) | Penetration Temperature (° C) | Impact Strength (kg-cm/cm²) | Gelation Time by Plastograph (sec.) | Odor through Kneading | Odor through Shaping |
|---|---|---|---|---|---|---|---|
| Example 1 | 67.0 | 48 | 127 | 2.2 | 118 | No Unpleasant Odor Generated | No Unpleasant Odor Generated |
| Example 11 | 67.1 | 49 | 127 | 2.1 | 116 | | |

It is clear from Table 5 that the emission of unpleasant odor while kneading or shaping of a resin may be avoided without affecting the physical properties of Cl-VCR, by using liquid paraffin as a diluent for the catalyst in the process for the preparation of VCR by the suspension polymerization according to the invention.

Figure 6:
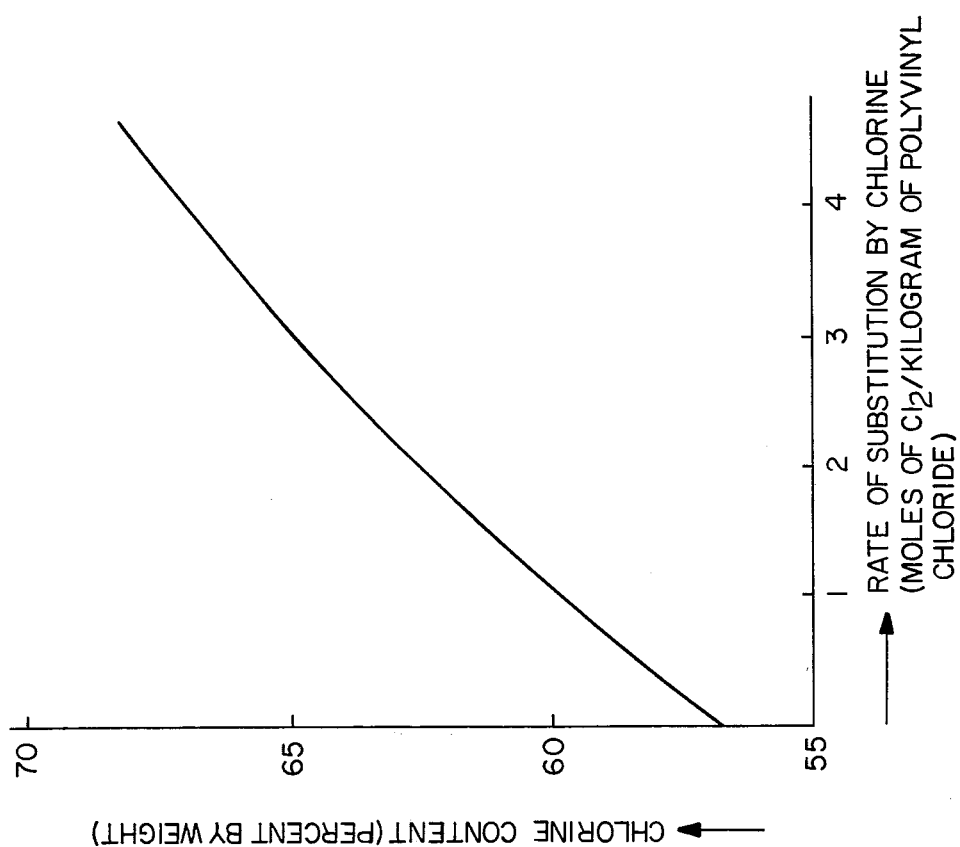

FIG. 6 represents a correlation between the chlorine content and the rate of substitution by chlorine, being expressed in percent by weight and moles of chlorine per kilogram of polyvinyl chloride respectively.

ANNEXED TABLES

Example 1

| Reaction Time (Hr.) | 1 | 2 | 3 | 4 | 5 | 6 | 7 | 8 | 9 | 10 |
|---|---|---|---|---|---|---|---|---|---|---|
| Reaction Rate | 0.41 | 0.42 | 0.40 | 0.40 | 0.41 | 0.41 | 0.42 | 0.42 | 0.42 | 0.42 |
| Chlorine Content (%) | 58.1 | 59.3 | 60.4 | 61.5 | 62.5 | 63.5 | 64.4 | 65.3 | 66.2 | 67.0 |
| $K_2CrO_4$ (ppm)* | 72 | 52 | 42 | 32 | 25 | 20 | 16 | 9 | 0 | 0 |

*(140 at the starting time)

Comparative Example 1

| Reaction Time (Hr.) | 1 | 2 | 3 | 4 | 5 | 6 | 7 | 8 | 9 | 10 |
|---|---|---|---|---|---|---|---|---|---|---|
| Reaction Rate | 1.24 | 0.65 | 0.49 | 0.39 | 0.33 | 0.27 | 0.24 | 0.22 | 0.20 | 0.14 |
| Chlorine Content (%) | 60.5 | 62.1 | 63.3 | 64.2 | 64.9 | 65.5 | 66.0 | 66.4 | 66.8 | 67.0 |
| $K_2CrO_4$ (ppm) | 45 | 45 | 45 | 45 | 45 | 45 | 45 | 45 | 45 | 45 |

Example 2

| Reaction Time (Hr.) | 1 | 2 | 3 | 4 | 5 | 6 |
|---|---|---|---|---|---|---|
| Reaction Rate | 0.68 | 0.69 | 0.69 | 0.70 | 0.70 | 0.71 |
| Chlorine Content (%) | 58.9 | 60.8 | 62.5 | 64.2 | 65.7 | 67.0 |
| $K_2CrO_4$ (ppm) | 40 | 27 | 16 | 10 | 5 | 0 |

(75 at the starting time)

Example 3

| Reaction Time (Hr.) | 1 | 2 | 3 | 4 | 5 | 6 | 7 | 8 |
|---|---|---|---|---|---|---|---|---|
| Reaction Rate | 0.52 | 0.51 | 0.52 | 0.52 | 0.52 | 0.53 | 0.53 | 0.52 |
| Chlorine Content (%) | 58.4 | 59.9 | 61.3 | 62.6 | 63.8 | 65.0 | 66.1 | 67.0 |
| $K_2CrO_4$ (ppm) | 57 | 40 | 29 | 21 | 14 | 12 | 10 | 0 |

(100 at the starting time)

Example 4

| Reaction Time (Hr.) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Reaction Rate | 0.28 | 0.27 | 0.27 | 0.27 | 0.27 | 0.28 | 0.27 | 0.27 | 0.28 | 0.29 | 0.29 | 0.29 | 0.28 | 0.28 | 0.28 |
| Chlorine Content (%) | 57.7 | 58.5 | 59.2 | 60.0 | 60.8 | 61.5 | 62.2 | 62.8 | 63.5 | 64.1 | 64.8 | 65.4 | 66.0 | 66.5 | 67.0 |
| $K_2CrO_4$ (ppm)* | 132 | 78 | 69 | 52 | 42 | 38 | 34 | 24 | 14 | 7 | 4 | 2 | 1 | 0 | 0 |

*(250 at the starting time)

Example 5

| Reaction Time (Hr.) | 1 | 2 | 3 | 4 | 5 | 6 | 7 | 8 | 9 | 10 |
|---|---|---|---|---|---|---|---|---|---|---|
| Reaction Rate | 0.41 | 0.41 | 0.41 | 0.42 | 0.42 | 0.42 | 0.42 | 0.42 | 0.42 | 0.42 |
| Chlorine Content (%) | 58.1 | 59.2 | 60.4 | 61.5 | 62.6 | 63.6 | 64.5 | 65.4 | 66.3 | 67.0 |
| $K_2CrO_4$ (ppm)* | 75 | 50 | 40 | 30 | 25 | 20 | 15 | 10 | 0 | 0 |

*(140 at the starting time)

Example 6

| Reaction Time (Hr.) | 1 | 2 | 3 | 4 | 5 | 6 | 7 | 8 | 9 | 10 | 10.6 |
|---|---|---|---|---|---|---|---|---|---|---|---|
| Reaction | 0.39 | 0.38 | 0.38 | 0.39 | 0.39 | 0.40 | 0.39 | 0.40 | 0.40 | 0.41 | 0.40 |

ANNEXED TABLES -continued

| Rate | | | | | | | | | | | |
|---|---|---|---|---|---|---|---|---|---|---|---|
| Chlorine Content (%) | 58.0 | 59.1 | 60.2 | 61.2 | 62.2 | 63.2 | 64.1 | 65.0 | 65.8 | 66.6 | 67.0 |
| K$_2$CrO$_4$ (ppm)* | 75 | 50 | 40 | 30 | 25 | 20 | 15 | 10 | 0 | 0 | 0 |

*(140 at the starting time)

Example 7

| Reaction Time (Hr.) | 1 | 2 | 3 | 4 | 5 | 6 | 7 | 8 | 9 | 10 | 11 | 12 |
|---|---|---|---|---|---|---|---|---|---|---|---|---|
| Reaction Rate | 0.39 | 0.38 | 0.39 | 0.40 | 0.56 | 0.47 | 0.42 | 0.40 | 0.31 | 0.26 | 0.14 | 0.05 |
| Chlorine Content (%) | 58.0 | 59.1 | 60.2 | 61.3 | 62.7 | 63.8 | 64.7 | 65.6 | 66.2 | 66.7 | 66.9 | 67.0 |
| K$_2$CrO$_4$ (ppm)* | 80 | 54 | 42 | 18 | 0 | 0 | 0 | 0 | 0 | 0 | 0 | 0 |

*(140 at the starting time)

Comparative Example 2

| Reaction Time (Hr.) | 1 | 2 | 2.7 |
|---|---|---|---|
| Reaction Rate | 1.53 | 1.54 | 1.56 |
| Chlorine Content (%) | 61.2 | 64.8 | 67.0 |
| K$_2$CrO$_4$ (ppm) | 8 | 0 | 0 |

(33 at the starting time)

Comparative Example 3

| Reaction Time (Hr.) | 1 | 2 | 3 | 4 |
|---|---|---|---|---|
| Reaction Rate | 1.03 | 1.03 | 10.5 | 1.06 |
| Chlorine Content (%) | 59.9 | 62.5 | 65.0 | 67.0 |
| K$_2$CrO$_4$ (ppm) | 21 | 10 | 3 | 0 |

(52 at the starting time)

Comparative Example 4

| Reaction Time (Hr.) | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Reaction Rate | 0.15 | 0.14 | 0.15 | 0.15 | 0.15 | 0.15 | 0.16 | 0.15 | 0.15 | 0.15 | 0.15 | 0.16 | 0.15 | 0.15 | 0.15 |
| Chlorine Content (%) | 57.3 | 57.7 | 58.2 | 58.6 | 59.0 | 59.5 | 59.9 | 60.3 | 60.7 | 61.1 | 61.5 | 61.9 | 62.3 | 62.7 | 63.0 |
| K$_2$CrO$_4$ (ppm)* | 500 | 140 | 105 | 82 | 74 | 64 | 60 | 53 | 43 | 35 | 29 | 24 | 19 | 15 | 12 |
| | 16 | 17 | 18 | 19 | 20 | 21 | 22 | 23 | 24 | 25 | 26 | 26.7 | | | |
| | 0.16 | 0.16 | 0.16 | 0.16 | 0.16 | 0.17 | 0.17 | 0.17 | 0.17 | 0.16 | 0.16 | 0.16 | | | |
| | 63.4 | 63.8 | 64.1 | 64.5 | 64.8 | 65.2 | 65.6 | 65.9 | 66.2 | 66.0 | 66.9 | 67.0 | | | |
| | 8 | 5 | 4 | 4 | 2 | 2 | 1 | 1 | 0 | 0 | 0 | 0 | | | |

*(1000 at the starting time)

Comparative Example 5

| Reaction Time (Hr.) | 1 | 2 | 3 | 4 | 5 | 6 | 7 | 8 | 9 | 10 |
|---|---|---|---|---|---|---|---|---|---|---|
| Reaction Rate | 1.26 | 0.65 | 0.49 | 0.39 | 0.33 | 0.27 | 0.23 | 0.21 | 0.19 | 0.15 |
| Chlorine Content (%) | 61.0 | 62.2 | 63.4 | 64.2 | 65.0 | 65.5 | 66.0 | 66.4 | 66.8 | 67.0 |
| K$_2$CrO$_4$ (ppm) | 45 | 45 | 45 | 45 | 45 | 45 | 45 | 45 | 45 | 45 |

Example 8

| Reaction Time (Hr.) | 1 | 2 | 3 | 4 | 5 | 6 | 7 | 8 | 9 | 10 |
|---|---|---|---|---|---|---|---|---|---|---|
| Reaction Rate | 0.40 | 0.39 | 0.40 | 0.40 | 0.41 | 0.40 | 0.41 | 0.41 | 0.42 | 0.42 |
| Chlorine Content (%) | 55.7 | 56.7 | 58.2 | 59.3 | 60.4 | 61.4 | 62.3 | 63.3 | 64.3 | 65.3 |
| K$_2$CrO$_4$ (ppm)* | 78 | 53 | 42 | 32 | 26 | 21 | 18 | 10 | 4 | 0 |

*(150 at the starting time)

Example 9

| Reaction Time (Hr.) | 1 | 2 | 3 | 4 | 5 | 6 | 7 | 8 | 9 | 10 |
|---|---|---|---|---|---|---|---|---|---|---|
| Reaction Rate | 0.39 | 0.38 | 0.39 | 0.39 | 0.40 | 0.40 | 0.41 | 0.42 | 0.42 | 0.42 |
| Chlorine Content (%) | 53.4 | 54.8 | 56.0 | 57.1 | 58.3 | 59.3 | 60.3 | 61.3 | 62.3 | 63.3 |
| K$_2$CrO$_4$ (ppm)* | 80 | 54 | 43 | 33 | 26 | 21 | 17 | 10 | 4 | 0 |

*(160 at the starting time)

Comparative Example 6

| Reaction Time (Hr.) | 1 | 2 | 3 | 4 | 5 | 6 | 7 | 8 | 9 | 10 |
|---|---|---|---|---|---|---|---|---|---|---|
| Reaction Rate | 1.22, 0.64 | 0.48 | 0.38 | 0.33 | 0.27 | 0.25 | 0.22 | 0.20 | 0.14 | |

-continued
ANNEXED TABLES

| Chlorine Content (%) | 58.3 | 60.0 | 61.2 | 62.1 | 62.9 | 63.6 | 64.1 | 64.6 | 65.0 | 65.3 |
|---|---|---|---|---|---|---|---|---|---|---|
| K$_2$CrO$_4$ (ppm) | 45 | 45 | 45 | 45 | 45 | 45 | 45 | 45 | 45 | 45 |

Comparative Example 7

| Reaction Time (Hr.) | 1 | 2 | 3 | 4 | 5 | 6 | 7 | 8 | 9 | 10 |
|---|---|---|---|---|---|---|---|---|---|---|
| Reaction Rate | 1.21 | 0.63 | 0.48 | 0.38 | 0.32 | 0.27 | 0.24 | 0.21 | 0.19 | 0.14 |
| Chlorine Content(%) | 56.1 | 57.9 | 59.3 | 60.2 | 61.0 | 61.6 | 62.1 | 62.6 | 63.0 | 63.3 |
| K$_2$CrO$_4$ (ppm) | 45 | 45 | 45 | 45 | 45 | 45 | 45 | 45 | 45 | 45 |

NOTE: In each table, the reaction rate represents an average reaction rate (mole/hour/kg of polyvinyl chloride) during one hour up to the reaction time indicated in a top column.

What is claimed is:

1. A process for preparing a chlorinated polymer or copolymer of vinyl chloride which comprises varying the quantity of ultraviolet rays irradiated to a unit amount of the polymer or copolymer in accordance with the progress of the chlorination reaction to control the reaction rate within the range of from 0.75 –0.25 mole/hour/kilogram of the polymer or copolymer until the rate of substitution of chlorine attains at least 1.6 moles/kilogram of the polymer or copolymer, the polymer or copolymer being chlorinated in an aqueous suspension absent any solvent for the polymer or copolymer and under irradiation of ultraviolet rays.

2. The process as defined in claim 1 wherein the reaction rate is maintained within the range of from 0.75 – 0.25 mole/hour/kilogram of polymer or copolymer of vinyl chloride throughout a period from the beginning to the end of the reaction.

3. The process as defined in claim 1 wherein the polymer of copolymer of vinyl chloride is prepared by suspension polymerization using liquid paraffin as a diluent for an oil-soluble catalyst.

4. The process as defined in claim 1 wherein potassium chromate is used as an absorbent for varying the quantity of the ultraviolet rays.

5. The process as defined in claim 1 wherein the polymer or copolymer of vinyl chloride is selected from a group consisting of polyvinyl chloride, a copolymer of vinyl chloride and ethylene, a copolymer of vinyl chloride and propylene, a copolymer of vinyl acetate and ethylene and a graft copolymer of vinyl chloride grafted onto a copolymer of vinyl acetate and ethylene.

* * * * *

UNITED STATES PATENT AND TRADEMARK OFFICE
CERTIFICATE OF CORRECTION

PATENT NO. : 4,049,517
DATED : September 20, 1977
INVENTOR(S) : TERUFUMI ADACHI ET AL It is certified that error appears in the above-identified patent and that said Letters Patent are hereby corrected as shown below:

In the item of Inventors, change "Shinnan, Japan" to read -- Shinnanyoshi, Japan --.

Col. 5, line 49, change "a. Into" to --(a) Into--.

Col. 5, line 63, change "b. In" to --(b) In--.

Col. 7, line 14, Table 1, change "43" to --48--.

Cols. 13 and 14, Comparative Example 6, change

" | 1 | 2 | 3 | 4 | 5 | 6 | 7 | 8 | 9 | 10 |
|---|---|---|---|---|---|---|---|---|---|
| 1.22 | 0.48 | 0.38 | 0.33 | 0.27 | 0.25 | 0.22 | 0.20 | 0.14 | 0.64 |
"

to

-- | 1 | 2 | 3 | 4 | 5 | 6 | 7 | 8 | 9 | 10 |
|---|---|---|---|---|---|---|---|---|---|
| 1.22 | 0.64 | 0.48 | 0.38 | 0.33 | 0.27 | 0.25 | 0.22 | 0.20 | 0.14 |
 --.

Signed and Sealed this

Second Day of May 1978

[SEAL]

Attest:

RUTH C. MASON
*Attesting Officer*

LUTRELLE F. PARKER
*Acting Commissioner of Patents and Trademarks*